(12) United States Patent
Liu et al.

(10) Patent No.: US 12,439,439 B2
(45) Date of Patent: Oct. 7, 2025

(54) METHOD FOR TRANSMISSION RESOURCE MONITORING, METHOD FOR TRANSMISSION RESOURCE DETERMINATION, AND COMMUNICATIONS DEVICE

(71) Applicant: VIVO MOBILE COMMUNICATION CO., LTD., Guangdong (CN)

(72) Inventors: Shixiao Liu, Guangdong (CN); Zichao Ji, Guangdong (CN); Shuyan Peng, Guangdong (CN); Wei Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 309 days.

(21) Appl. No.: 17/401,788

(22) Filed: Aug. 13, 2021

(65) Prior Publication Data

US 2021/0377959 A1 Dec. 2, 2021

Related U.S. Application Data

(63) Continuation of application No. PCT/CN2020/075275, filed on Feb. 14, 2020.

(30) Foreign Application Priority Data

Feb. 15, 2019 (CN) .......................... 201910118115.3

(51) Int. Cl.
*H04W 72/541* (2023.01)
*H04W 24/08* (2009.01)
(Continued)

(52) U.S. Cl.
CPC ......... *H04W 72/541* (2023.01); *H04W 24/08* (2013.01); *H04W 24/10* (2013.01); *H04W 72/20* (2023.01)

(58) Field of Classification Search
None
See application file for complete search history.

(56) References Cited

U.S. PATENT DOCUMENTS 11,895,703 B2* 2/2024 Lee ....................... H04W 76/14
2017/0013628 A1 1/2017 Kim et al.
(Continued)

FOREIGN PATENT DOCUMENTS

CN 103209492 A 7/2013
CN 103702346 A 4/2014
(Continued)

OTHER PUBLICATIONS

Samsung, "Considerations on Sidelink CSI", 3GPP TSG RAN WG1 Ad-Hoc Meeting 1901, R1-1901053, Taipei, Taiwan, Jan. 21-25, 2019.
(Continued)

*Primary Examiner* — Gregory B Sefcheck
(74) *Attorney, Agent, or Firm* — Price Heneveld LLP

(57) ABSTRACT

This disclosure provides a method for transmission resource monitoring, a method for transmission resource determination, and a communications device. The method for transmission resource monitoring includes: performing interference monitoring on a transmission resource; and transmitting first feedback information to a second communications device; where the first feedback information is information that is determined by the first communications device based on an interference monitoring result, the first feedback information is used for the second communications device to determine a target resource, and the target resource is used for a transmit terminal to transmit data to a receive terminal; and the first communications device is the receive terminal, and the second communications device includes at least one of the transmit terminal or a scheduling node; or the first communications device is the transmit terminal, and
(Continued)

the second communications device includes at least one of the receive terminal or a scheduling node.

19 Claims, 5 Drawing Sheets

(51) Int. Cl.
*H04W 24/10* (2009.01)
*H04W 72/20* (2023.01)

(56) References Cited

U.S. PATENT DOCUMENTS

| | | | |
|---|---|---|---|
| 2017/0347394 A1 | 11/2017 | Yasukawa et al. | |
| 2018/0206176 A1* | 7/2018 | Panteleev | H04W 28/04 |
| 2018/0255532 A1* | 9/2018 | Li | H04L 1/00 |
| 2019/0246387 A1 | 8/2019 | Lee et al. | |
| 2020/0022089 A1* | 1/2020 | Guo | H04L 1/1812 |
| 2020/0059915 A1* | 2/2020 | Lee | H04W 56/0015 |
| 2020/0163155 A1* | 5/2020 | Lee | H04L 5/0053 |
| 2021/0204307 A1* | 7/2021 | Lee | H04W 76/14 |
| 2021/0297221 A1* | 9/2021 | Lee | H04L 1/1864 |
| 2021/0314962 A1* | 10/2021 | Ashraf | H04B 17/309 |
| 2021/0410084 A1* | 12/2021 | Li | H04W 52/265 |
| 2022/0007403 A1* | 1/2022 | Li | H04W 72/20 |
| 2022/0014338 A1* | 1/2022 | Yoshioka | H04W 8/005 |
| 2022/0022228 A1* | 1/2022 | Wang | H04W 4/46 |
| 2022/0038217 A1* | 2/2022 | Yoshioka | H04L 1/1819 |
| 2022/0085923 A1* | 3/2022 | Ye | H04L 1/1825 |
| 2022/0103292 A1* | 3/2022 | Hwang | H04W 76/28 |
| 2022/0104238 A1* | 3/2022 | Aiba | H04L 5/0053 |
| 2023/0066942 A1* | 3/2023 | Liu | H04L 5/0057 |
| 2023/0163924 A1* | 5/2023 | Lee | H04W 72/115 |
| | | | 370/329 |

FOREIGN PATENT DOCUMENTS

| | | |
|---|---|---|
| CN | 103957518 A | 7/2014 |
| CN | 104284340 A | 1/2015 |
| CN | 107079437 A | 8/2017 |
| CN | 108632781 A | 10/2018 |
| WO | 2015113247 A1 | 8/2015 |
| WO | 2017026970 A1 | 2/2017 |
| WO | 2018012774 A1 | 1/2018 |

OTHER PUBLICATIONS

Huawei, "Sidelink CSI", 3GPP TSG RAN WG1 Ad-Hoc Meeting 1901, R1-1900857, Taipei, Jan. 21-25, 2019.

* cited by examiner

METHOD FOR TRANSMISSION RESOURCE MONITORING, METHOD FOR TRANSMISSION RESOURCE DETERMINATION, AND COMMUNICATIONS DEVICE

CROSS-REFERENCE TO RELATED APPLICATIONS

This application is a continuation application of International Application No. PCT/CN2020/075275 filed on Feb. 14, 2020, which claims priority to Chinese Patent Application No. 201910118115.3, filed in China on Feb. 15, 2019, both disclosures of which are incorporated herein by reference in their entireties.

TECHNICAL FIELD

This disclosure relates to the field of communications technologies, and in particular, to a method for transmission resource monitoring, a method for transmission resource determination, and a communications device.

BACKGROUND

Sidelink is a link for direct communication between terminals. Sidelink allows a terminal to make autonomous resource selection. At present, a technical solution for autonomous resource selection by a terminal is that a transmit terminal performs interference monitoring and determines a resource based on an interference monitoring result.

However, the resource determined by the transmit terminal based on the interference monitoring result may not properly reflect a channel state of the receive terminal, resulting in relatively low resource utilization.

SUMMARY

According to a first aspect, an embodiment of this disclosure provides a method for transmission resource monitoring, applied to a first communications device. The method includes:

performing interference monitoring on a transmission resource; and transmitting first feedback information to a second communications device.

The first feedback information is information that is determined by the first communications device based on an interference monitoring result, the first feedback information is used for the second communications device to determine a target resource, and the target resource is used for a transmit terminal to transmit data to a receive terminal.

The first communications device is the receive terminal, and the second communications device includes at least one of the transmit terminal or a scheduling node; or the first communications device is the transmit terminal, and the second communications device includes at least one of the receive terminal or a scheduling node.

According to a second aspect, an embodiment of this disclosure provides a method for transmission resource determination, applied to a second communications device. The method includes:

receiving first feedback information transmitted by a first communications device, where the first feedback information is information that is determined by the first communications device based on an interference monitoring result; and determining a target resource based on the first feedback information.

The target resource is used for a transmit terminal to transmit data to a receive terminal.

The first communications device is the receive terminal, and the second communications device includes at least one of the transmit terminal or a scheduling node; or the first communications device is the transmit terminal, and the second communications device includes at least one of the receive terminal or a scheduling node.

According to a third aspect, an embodiment of this disclosure provides a first communications device, including:

a monitoring module, configured to perform interference monitoring on a transmission resource; and a feedback module, configured to transmit first feedback information to a second communications device.

The first feedback information is information that is determined by the first communications device based on an interference monitoring result, the first feedback information is used for the second communications device to determine a target resource, and the target resource is used for a transmit terminal to transmit data to a receive terminal.

The first communications device is the receive terminal, and the second communications device includes at least one of the transmit terminal or a scheduling node; or the first communications device is the transmit terminal, and the second communications device includes at least one of the receive terminal or a scheduling node.

According to a fourth aspect, an embodiment of this disclosure provides a second communications device, including:

a receiving module, configured to receive first feedback information transmitted by a first communications device, where the first feedback information is information that is determined by the first communications device based on an interference monitoring result; and a determining module, configured to determine a target resource based on the first feedback information.

The target resource is used for a transmit terminal to transmit data to a receive terminal.

The first communications device is the receive terminal, and the second communications device includes at least one of the transmit terminal or a scheduling node; or the first communications device is the transmit terminal, and the second communications device includes at least one of the receive terminal or a scheduling node.

According to a fifth aspect, an embodiment of this disclosure provides a communications device, including: a memory, a processor, and a computer program stored in the memory and capable of running on the processor, where when the computer program is executed by the processor, the steps of the method for transmission resource monitoring according to the first aspect in the embodiments of this disclosure are implemented, or the steps of the method for transmission resource determination according to the second aspect in the embodiments of this disclosure are implemented.

According to a sixth aspect, an embodiment of this disclosure provides a computer-readable storage medium, where a computer program is stored in the computer-readable storage medium, and when the computer program is executed by a processor, the steps of the method for transmission resource monitoring according to the first aspect in the embodiments of this disclosure are implemented, or the steps of the method for transmission resource determination according to the second aspect in the embodiments of this disclosure are implemented.

BRIEF DESCRIPTION OF DRAWINGS

To describe the technical solutions in the embodiments of this disclosure more clearly, the following briefly introduces the accompanying drawings required for describing the embodiments of this disclosure. Apparently, the accompanying drawings in the following description show merely some embodiments of this disclosure, and a person of ordinary skill in the art may still derive other drawings from these accompanying drawings.

DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: only A, only B, and both A and B.

In the embodiments of the present disclosure, terms such as "an example" or "for example" are used to represent examples, illustrations, or explanations. Any embodiment or design scheme described as "an example" or "for example" in the embodiments of this disclosure should not be construed as being more preferred or advantageous than other embodiments or design schemes. To be precise, the words such as "an example" or "for example" are intended to present a related concept in a specific manner.

The following describes the embodiments of this disclosure with reference to the accompanying drawings. A method for transmission resource monitoring provided in the embodiments of the present disclosure may be applied to a wireless communications system. The wireless communications system may be a 5G system, an evolved long term evolution (eLTE) system, or a subsequent evolved communications system.

Figure 1:
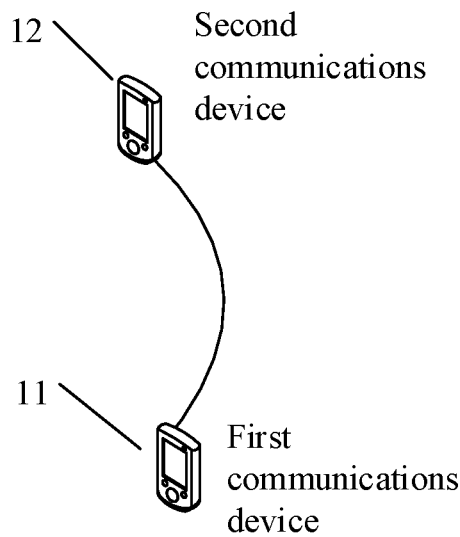
FIG. 1 is a system diagram of a transmission resource monitoring system according to an embodiment of this disclosure.

FIG. 1 is a structural diagram of a transmission resource monitoring system according to an embodiment of this disclosure. As shown in FIG. 1, a first communications device 11 and a second communications device 12 are included. The first communications device 11 may be a receive terminal or may be a transmit terminal. The second communications device 12 may include at least one of a transmit terminal, a receive terminal, or a scheduling node. In a case that the first communications device 11 is a receive terminal, the second communications device 12 may include at least one of a transmit terminal or a scheduling node; in a case that the first communications device 11 is a transmit terminal, the second communications device 12 may include at least one of a receive terminal or a scheduling node. The scheduling node may include at least one of a terminal, a network-side device, or an Road-Side Unit (RSU).

In the embodiments of this disclosure, the terminal (such as a transmit terminal, a receive terminal, or a terminal acting as a scheduling node) may be a mobile communications device, for example, may be a mobile phone, a tablet computer (Tablet Personal Computer), a laptop computer, a personal digital assistant (PDA), a mobile Internet device (MID), or a wearable device. It should be noted that a specific type of the terminal is not limited in the embodiments of this disclosure. The network-side device may be a 5G network-side device (such as a gNB or a 5G NR NB), or may be a 4G network-side device (such as an eNB), or may be a 3G network-side device (such as an NB) or a network-side device in a later evolved communications system, or the like. It should be noted that a specific type of the network-side device is not limited in the embodiments of this disclosure.

Before the technical solutions in the embodiments of this disclosure are described in detail, the following first describes briefly sidelink, V2X communication, and a terminal autonomous resource selection mode.

Sidelink is a link for direct communication between terminals without a network-side device. Sidelink allows a terminal to make autonomous resource selection. Vehicle to everything (V2X) communication is included in both long term evolution (LTE) sidelink and new radio (NR) sidelink. LTE V2X only provides the broadcast service which is periodic, with a relatively stable size of a service packet. Therefore, in the terminal autonomous resource selection mode of LTE V2X, the terminal may periodically reserve some resources based on a resource monitoring result of a period of time. Specifically, the transmit terminal performs interference monitoring on a resource, and the transmit terminal determines a resource based on an interference monitoring result.

However, the resource determined by the transmit terminal based on the interference monitoring result may not properly reflect a channel state of the receive terminal, resulting in inaccurate or improper resource determination.

Moreover, the resource determined in the foregoing resource monitoring manner cannot be well applied to transmission of aperiodic services. In NR V2X, unicast, multicast, and broadcast services need to be supported; aperiodic services also need to be supported; and data packets are also variable in size. In addition, NR V2X has relatively strict requirements on reliability and delay for service data transmission. Therefore, performing interference monitoring on the resource by the transmit terminal to implement autonomous resource selection for the transmit terminal could result in lower resource utilization and deteriorated performance of the communication system.

In view of this, the embodiments of this disclosure provide a transmission resource monitoring system shown in FIG. 1, and provide a method for transmission resource monitoring applied to such transmission resource monitoring system, as described below.

A first communications device performs interference monitoring on a transmission resource;

the first communications device transmits first feedback information to a second communications device, where the first feedback information is information that is determined by the first communications device based on an interference monitoring result;

the second communications device receives the first feedback information; and the second communications device determines a target resource based on the first feedback information, where the target resource is used for a transmit terminal to transmit data to a receive terminal.

In the embodiments of this disclosure, in a case that the first communications device is a receive terminal, the second communications device may be a transmit terminal or a scheduling node. To be specific, the receive terminal performs interference monitoring on the transmission resource, determines the first feedback information based on the interference monitoring result, and then transmits the first feedback information to the transmit terminal or the scheduling node, so that the transmit terminal or the scheduling node determines the target resource based on the first feedback information. In this way, the first feedback information that is determined through interference monitoring by the receive terminal can better reflect an actual channel state of the receive terminal, so that the resource determined by the transmit terminal or the scheduling node can better reflect the actual channel state of the receive terminal accordingly.

In a case that the first communications device is a transmit terminal, the second communications device may be a receive terminal or a scheduling node. To be specific, the transmit terminal performs interference monitoring on the transmission resource, determines the first feedback information based on the interference monitoring result, and then transmits the first feedback information to the receive terminal or the scheduling node, so that the receive terminal or the scheduling node determines the target resource based on the first feedback information. Here, the first feedback information transmitted by the transmit terminal may be used as assistance information for assisting the receive terminal or the scheduling node in determining the target resource. In this way, the resource determined by the receive terminal or the scheduling node can better reflect the actual channel state of the receive terminal.

In the embodiments of this disclosure, the first communications device performs interference monitoring on the transmission resource, determines feedback information based on the interference monitoring result, and transmits the feedback information to the second communications node, so that the second communications node can determine a resource based on the feedback information. Because interference monitoring and resource determination are performed by the first communications device and the second communications device respectively, the determined resource can better reflect an actual channel state of the receive terminal, thereby improving a success rate of data reception from the transmit terminal by the receive terminal, improving resource utilization, and improving performance of the communications system.

Figure 2:
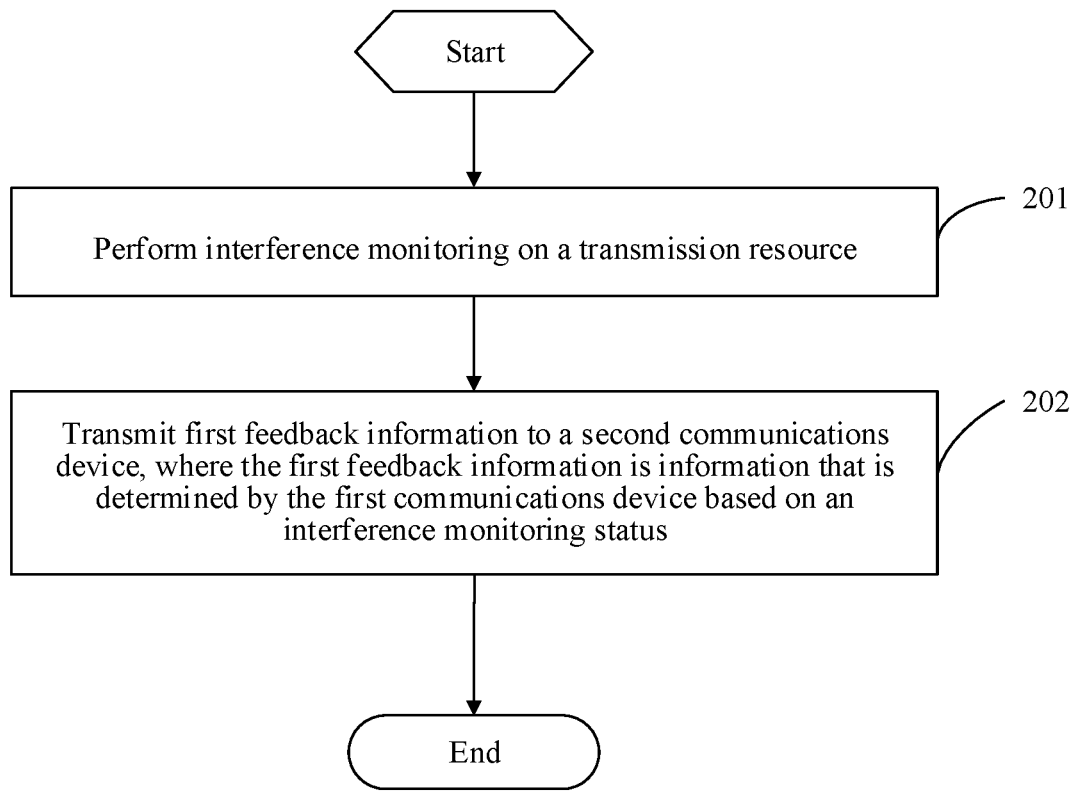
FIG. 2 is a flowchart of a method for transmission resource monitoring according to an embodiment of this disclosure.

FIG. 2 is a flowchart of a method for transmission resource monitoring according to an embodiment of this disclosure. As shown in FIG. 2, the method for transmission resource monitoring is applied to a first communications device, and the method includes the following steps.

Step 201: Perform interference monitoring on a transmission resource.

Step 202: Transmit first feedback information to a second communications device, where the first feedback information is information that is determined by the first communications device based on an interference monitoring result.

In this embodiment of this disclosure, the first feedback information is used for the second communications device to determine a target resource, and the target resource is used for a transmit terminal to transmit data to a receive terminal.

The first communications device is the receive terminal, and the second communications device may include at least one of the transmit terminal or a scheduling node. Alternatively, the first communications device is the transmit terminal, and the second communications device may include at least one of the receive terminal or a scheduling node.

Interference monitoring on the transmission resource may include interference power monitoring on the transmission resource, and may also include monitoring on a resource occupancy status of the transmission resource.

It should be noted that the resource included in this application may include a time-domain resource, a frequency-domain resource, or a space-domain resource, which is not limited in this embodiment of this disclosure.

In this embodiment of this disclosure, the receive terminal may perform interference monitoring on the transmission resource, determines the first feedback information based on the interference monitoring result, and then transmits the first feedback information to the transmit terminal or the scheduling node, so that the transmit terminal or the scheduling node determines the target resource based on the first feedback information. In this way, the first feedback information that is determined through interference monitoring by the receive terminal can better reflect the actual channel state of the receive terminal, so that the resource determined by the transmit terminal or the scheduling node can better reflect the actual channel status of the receive terminal accordingly.

In this embodiment of this disclosure, the transmit terminal may alternatively perform interference monitoring on the transmission resource, determines the first feedback information based on the interference monitoring result, and then transmits the first feedback information to the receive terminal or the scheduling node, so that the receive terminal or the scheduling node determines the target resource based on the first feedback information. Here, the first feedback information transmitted by the transmit terminal may be used as assistance information for assisting the receive terminal or the scheduling node in determining the target resource. In this way, the resource determined by the receive terminal or the scheduling node can better reflect the actual channel state of the receive terminal.

In order to better understand the technical solution in this embodiment of this disclosure, the following uses a plurality of examples to illustrate this embodiment of this disclosure.

Example 1: It is assumed that A acts as a data transmit end (which is the transmit terminal, the same below) and B acts as a data receive end (which is the receive terminal, the same below). B may perform interference monitoring on a transmission resource and transmits first feedback information to A. The first feedback information may indicate a relatively large number of candidate resources, and A can select some resources from these candidate resources as target resources for data transmission.

Example 2: It is assumed that A acts as a data transmit end, B acts as a data receive end, and C is a scheduling node. If A has data to transmit, C may transmit a monitoring trigger message to A, and A may perform interference monitoring on a transmission resource. After performing interference monitoring, A transmits first feedback information to C.

Example 3: It is assumed that A acts as a data transmit end and B acts as a data receive end. B may perform interference monitoring on a transmission resource, and transmits first feedback information to A at time T. A selects an appropriate resource based on the first feedback information transmitted by B and transmits data at time T+N. Within this period of time, other terminals, such as a terminal D, may also perform interference monitoring. D may perform resource exclusion based on the first feedback information transmitted by B at time T and SA (data control information) transmitted by A at time T+N. The SA is transmitted along with the data at time T+N.

It can be learned that, in this embodiment of this disclosure, because interference monitoring and resource determination are performed by the first communications device and the second communications device respectively, the determined resource can better reflect an actual channel state of the receive terminal, thereby improving a success rate of receiving data from the transmit terminal by the receive terminal, improving resource utilization, and improving performance of a communications system.

The following specifically describes two optional implementation manners of performing interference monitoring by the first communications device.

Manner 1: Before performing interference monitoring on the transmission resource, receive a monitoring trigger message transmitted by the second communications device; and perform interference monitoring on the transmission resource based on the monitoring trigger message.

In this manner, the second communications device may trigger the first communications device based on a requirement to perform interference monitoring. For example, in a case that the transmit terminal needs to transmit service data to the receive terminal, the transmit terminal or the scheduling node may transmit the monitoring trigger message to the receive terminal, so as to trigger the receive terminal to perform interference monitoring, thereby implementing resource determination and ultimately implementing effective transmission of service data.

Manner 2: Perform interference monitoring on the transmission resource based on a pre-configured interference monitoring parameter.

The interference monitoring parameter may be pre-configured by the receive terminal, or may be pre-configured by the scheduling node. The interference monitoring parameter may include a resource indication for the transmission resource on which interference monitoring is performed, or may include a periodicity parameter for interference monitoring. The interference monitoring periodicity may include at least one candidate period.

The following specifically describes two optional implementation manners of determining the first feedback information by the first communications device.

Manner 1: Decode second feedback information transmitted by a third communications device, so that the first communications device can determine the first feedback information based on the second feedback information. Specifically, the first communications device may perform resource exclusion and/or resource selection based on the second feedback information transmitted by the third communications device.

The third communications device does not include the transmit terminal and the receive terminal that are described above. That is, the third communications device is a communications device other than the transmit terminal and the receive terminal, for example, another terminal. The second feedback information includes resource indication information for transmitting data by the third communications device.

For example, the first communications device may decode second feedback information transmitted by other terminals to obtain IDs of interfering terminals and resource indication information for data transmission to be performed or to be possibly performed by the interfering terminals. In this way, the first communications device may measure interference intensity values of these interfering terminals on corresponding resources. When an interference intensity value is greater than a first threshold, the first communications device may exclude a corresponding resource, and randomly select the target resource from remaining resources. If interference intensity values of all resources are greater than the first threshold, the first communications device may select a resource with a smallest interference intensity value as the target resource.

For another example, the first communications device may decode current or historical control information transmitted by all interfering terminals to obtain resource indication information for data transmission of all the interfering terminals, and measures interference intensity values on corresponding resources. If an interference intensity value is greater than a second threshold, the first communications device may exclude a corresponding resource, and randomly select the target resource from all available resources. If interference intensity values of all resources are greater than the second threshold, the first communications device may select a resource with a smallest interference intensity value as the target resource.

Manner 2: In a case that the transmission resource is a determined resource pool, interference monitoring is performed on a full band or subband of the transmission resource within a preset time, and the first communications device may determine the first feedback information based on a measured value of interference intensity.

For example, for a determined resource pool, the first communications device may monitor the interference intensity on the full band of the resource pool within a first time window, and if the interference intensity is greater than a third threshold, determines that the resource pool is currently busy and there are no available resources; or if the interference intensity is less than the third threshold, randomly selects the target resource from the resource pool.

For another example, for a determined resource pool, the first communications device may monitor interference intensity on a subband of the resource pool within a second time window, and if the interference intensity is greater than a fourth threshold, determines that the subband is currently busy; or if all subbands are busy, determines that the resource pool is busy; or if there are idle subbands, randomly selects one subband from all the idle subbands as the target resource.

It should be noted that the interference strength included in this application may include reference signal received power (RSRP), or may include received signal strength indication (RSSI), or the like.

In this embodiment of this disclosure, the monitoring trigger message may be transmitted by using at least one of the following resources:

a default resource pool or dedicated resource pool that is pre-configured by a network-side device;

a separate physical channel resource; or a resource semi-statically reserved by the network-side device.

The default resource pool or the dedicated resource pool may be obtained from at least one of the following messages:

system information transmitted by the network-side device;

a downlink control information (DCI) message or radio resource control (RRC) message transmitted by the network-side device; or a sidelink control information (SCI) message transmitted by a terminal.

The separate physical channel resource may include at least one of the following:

a resource on which at least one of physical sidelink control channel (PSCCH), physical sidelink shared channel (PSSCH), physical sidelink discovery channel (PSDCH), physical sidelink broadcast channel (PSBCH), physical downlink shared channel (PDSCH), physical downlink control channel (PDCCH), or physical broadcast channel (PBCH) is located; or a resource on which a first channel is located, where the first channel may be a newly defined channel.

The semi-statically reserved resource may include at least one of the following:

at least one slot configured by the network-side device;

at least one symbol in at least one slot configured by the network-side device; or at least one segment of frequency-domain resources configured by the network-side device.

The semi-statically reserved resource is obtained from at least one of the following messages:

system information transmitted by the network-side device;

a DCI message or RRC message transmitted by the network-side device; or an SCI message transmitted by a terminal.

In this embodiment of this disclosure, the monitoring trigger message may include at least one of the following:

an identifier ID of the first communications device;

an ID of the second communications device;

a resource location indication for performing interference monitoring by the first communications device;

a resource location indication for transmitting the first feedback information by the first communications device;

power control information for transmitting the first feedback information by the first communications device;

an indication of transmission periodicity or next transmission occasion for transmitting the first feedback information by the first communications device;

a data size indication for transmitting the first feedback information by the first communications device; or a retransmission resource indication.

In this embodiment of this disclosure, the monitoring trigger message may be carried in at least one of a scheduling request (SR), a buffer status report (BSR), a MAC control element (MAC CE), SCI, sidelink feedback control information (SFCI), or RRC. Certainly, the monitoring trigger message may alternatively be carried in a new manner, which is not limited in this embodiment of this disclosure.

In this embodiment of this disclosure, a transmission mode of the monitoring trigger message may be a semi-static transmission mode or a dynamic transmission mode.

In the semi-static transmission mode, the second communications device may semi-statically (or periodically) transmit the monitoring trigger message to the first communications device, and the first communications device may perform interference monitoring based on a latest received monitoring trigger message.

In the semi-static transmission mode, the transmission periodicity of the monitoring trigger message may be indicated by a DCI message or RRC message that is transmitted by the network-side device, or may be indicated by system information that is transmitted by the network-side device. The semi-static transmission mode may be applied to transmission of a periodic service. The transmission periodicity of the monitoring trigger message may alternatively be bound to a data transmission/reception periodicity of the transmit terminal. For example, the transmission periodicity of the monitoring trigger message may be N times the data transmission/reception periodicity of the transmit terminal, where N is a positive integer. It is assumed that the transmission periodicity of the monitoring trigger message is T0, and the data transmission/reception periodicity of the transmit terminal is t, then T0=N*t.

In the dynamic transmission mode, the second communications device may dynamically transmit a monitoring trigger message to the first communications device. A trigger condition for transmitting the monitoring trigger message by the second communications device to the first communications device may be arrival of a data packet at the transmit terminal. The dynamic transmission mode may be applied to transmission of a periodic service or transmission of an aperiodic service.

In this embodiment of this disclosure, the interference monitoring parameter is obtained via at least one of the following:

system information transmitted by the network-side device;

a DCI message or RRC message transmitted by the network-side device; or an SCI message transmitted by a terminal.

In this embodiment of this disclosure, the first feedback information is fed back by using at least one of the following resources:

a resource indicated by a monitoring trigger message that is transmitted by the second communications device;

a default resource pool or dedicated resource pool that is pre-configured by a network-side device;

a separate physical channel resource; or a resource semi-statically reserved by the network-side device.

The default resource pool or the dedicated resource pool may be obtained from at least one of the following messages:

system information transmitted by the network-side device;

a DCI message or RRC message transmitted by the network-side device; or an SCI message transmitted by a terminal.

The separate physical channel resource may include at least one of the following:

a resource on which at least one of PSCCH, PSSCH, PSDCH, PSBCH, PDSCH, PDCCH, or PBCH is located; or a resource on which a second channel is located, where the second channel may be a newly-defined channel, and the second channel may be the same as or different from the first channel.

The semi-statically reserved resource may include at least one of the following:

at least one slot configured by the network-side device;

at least one symbol in at least one slot configured by the network-side device; or at least one segment of frequency-domain resources configured by the network-side device.

In this embodiment of this disclosure, the first feedback information may include at least one of the following:

a signal strength of a wanted signal, where the signal strength of the wanted signal may include at least one of RSRP or RSSI of the wanted signal;

a signal strength of an interference signal, where the signal strength of the interference signal may include at least one of RSRP or RSSI of the interference signal;

a resource indication for the transmission resource;

a time-domain indication for the target resource;

a frequency-domain indication for the target resource;

at least one of modulation and coding scheme (MCS) order, modulation scheme, or code rate indication for the target resource; or transmit power information for the target resource.

In this embodiment of this disclosure, the first feedback information is carried by using at least one of SCI, SFCI, RRC, or MAC CE. Certainly, the first feedback information may alternatively be carried in a new manner, which is not limited in this embodiment of this disclosure.

In this embodiment of this disclosure, the transmission resource on which the first communications device performs interference monitoring may be obtained via at least one of the following:

a monitoring trigger message transmitted by the second communications device;

system information transmitted by the network-side device;

a DCI message or RRC message transmitted by the network-side device; or an SCI message transmitted by a terminal.

In this embodiment of this disclosure, a decoding property of the first feedback information may include at least one of the following:

the first feedback information is decodable by the second communications device;

the first feedback information is decodable by all communications devices; or the first feedback information is decodable by at least two communications devices including the second communications device.

In this embodiment of this disclosure, a transmission mode of the first feedback message may be a semi-static transmission mode or a dynamic transmission mode.

In the semi-static transmission mode, the first communications device may semi-statically (or periodically) feed back the first feedback information to the second communications device. The transmission periodicity of the first feedback information may be indicated by a DCI message or RRC message that is transmitted by the network-side device, or may be indicated by system information that is transmitted by the network-side device. The transmission periodicity of the first feedback information may alternatively be indicated by a monitoring trigger message that is transmitted by the second communications device.

The semi-static transmission mode may be applied to transmission of a periodic service. The transmission periodicity of the first feedback information may alternatively be bound to a data transmission/reception periodicity of the transmit terminal. For example, the transmission periodicity of the first feedback information may be M times the data transmission/reception periodicity of the transmit terminal, where M is a positive integer. It is assumed that the transmission periodicity of the first feedback information is T1, and the data transmission/reception periodicity of the transmit terminal is t, then T1=M*t.

In the dynamic transmission mode, the first communications device may dynamically transmit the first feedback information to the second communications device. A transmission occasion for the first feedback information may be indicated by a monitoring trigger message that is transmitted by the second communications device, or may be indicated by a DCI message or RRC message that is transmitted by the network-side device, or may be indicated by system information that is transmitted by the network-side device.

The dynamic transmission mode may be applied to transmission of a periodic service or transmission of an aperiodic service.

For a better understanding of the technical solution in this embodiment of this disclosure, the following uses the first communications device being the receive terminal and the second communications device being the transmit terminal as an example to describe this embodiment of this disclosure with a plurality of examples.

Example 1: It is assumed that the transmit terminal transmits a monitoring trigger message on a resource semi-statically configured by the network-side device, and that a transmission resource configured in the monitoring trigger message is the last symbol of each slot. If the transmit terminal has a service to transmit in slot n, the transmit terminal may transmit the monitoring trigger message to the receive terminal in the last symbol of slot n. If the monitoring trigger message is transmitted on a separate physical channel A, the receive terminal may perform blind detection on the physical channel A.

Example 2: It is assumed that the first feedback information transmitted by the receive terminal is decodable by all communications devices, and first feedback information transmitted by other terminals includes time-domain and frequency-domain indications for data transmission. If the receive terminal decodes feedback messages transmitted by other terminals to learn that three terminals are to occupy 3 slots of the next 10 slots for data transmission and that RSSI interference strengths of the 3 slots are greater than a threshold, the receive terminal may randomly select one slot from remaining 7 slots as the target resource.

If resources are reserved for 20 terminals in the 10 slots, and RSSI interference strengths of all the slots are greater than a threshold, the receive terminal may select a slot with the smallest RSSI strength as the target resource.

Example 3: It is assumed that the first feedback information transmitted after interference monitoring by the receive terminal includes a time-domain and frequency-domain indication for transmitting data by the transmit terminal. For example, the first feedback information indicates that a time-domain resource for transmitting data by the transmit terminal is the 3rd and 7th slots of the next 10 slots and that a frequency-domain resource is the $10^{th}$ physical resource block (PRB) to the $20^{th}$ PRB. If a resource for transmitting data by the transmit terminal is determined by the receive terminal, the transmit terminal may directly use the resource indicated by the time-domain and frequency-domain indication in the first feedback information to transmit data. If the resource for transmitting data by the transmit terminal is determined by the transmit terminal, the transmit terminal may use the first feedback information as assistance information. For example, the transmit terminal may select the $3^{rd}$ and $7^{th}$ slots in time domain, and may select the $20^{th}$ to $30^{th}$ PRBs in frequency domain.

Example 4: It is assumed that a resource for feeding back the first feedback information by the receive terminal comes from a resource semi-statically reserved by the network-side device. It is assumed that a SCS (subcarrier bandwidth) is 15 kHz, that is, there are 10 slots in a radio frame, and each slot is 1 ms; and it is assumed that the resource semi-statically reserved by the network-side device are the first 7 symbols of the 5th slot and the 10th slot. When the transmission mode is a semi-static transmission mode, if the transmission periodicity is 10 ms, the receive terminal may feed back the first feedback information in the 5th slot, or feed back the first feedback information in the 5th slot of the next radio frame, or feed back the first feedback information in the 10th slot. When the transmission mode is a dynamic transmission mode, if the receive terminal receives, in the 1st slot, a monitoring trigger message transmitted by the transmit terminal, the receive terminal may feed back the first feedback information in the 5th slot.

Based on the foregoing implementation manners in this embodiment of this disclosure, it can be learned that in this embodiment of this disclosure, the first communications device performs interference monitoring on the transmission resource, determines feedback information based on the interference monitoring result, and transmits the feedback information to the second communications node, so that the second communications node can determine a resource based on the feedback information. Because interference monitoring and resource determination are performed by the first communications device and the second communications device respectively, the determined resource can better reflect an actual channel state of the receive terminal, thereby improving a success rate of receiving data from the transmit terminal by the receive terminal, improving resource utilization, and improving performance of a communications system.

Figure 3:
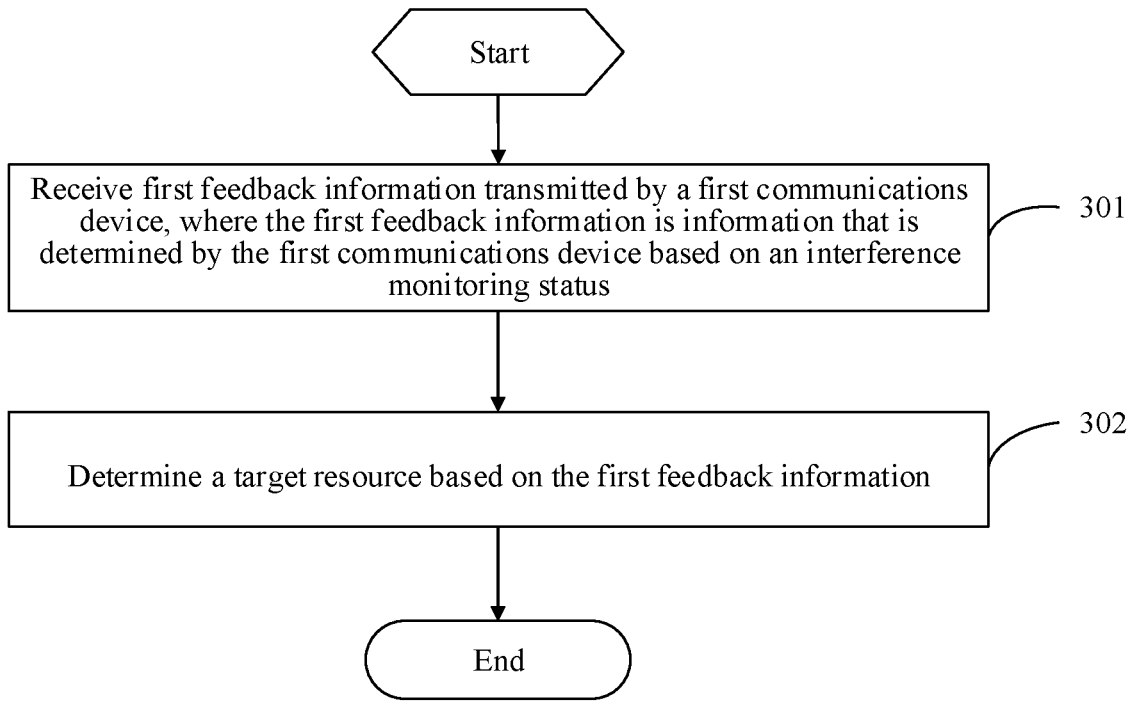
FIG. 3 is a flowchart of a method for transmission resource determination according to an embodiment of this disclosure.

FIG. 3 is a flowchart of a method for transmission resource determination according to an embodiment of this disclosure. As shown in FIG. 3, the method for transmission resource determination is applied to a second communications device, and the method includes the following steps.

Step 301: Receive first feedback information transmitted by a first communications device, where the first feedback information is information that is determined by the first communications device based on an interference monitoring result.

Step 302: Determine a target resource based on the first feedback information.

The target resource is used for a transmit terminal to transmit data to a receive terminal.

The first communications device is the receive terminal, and the second communications device includes at least one of the transmit terminal or a scheduling node; or the first communications device is the transmit terminal, and the second communications device includes at least one of the receive terminal or a scheduling node.

Optionally, the determining a target resource based on the first feedback information includes:

using the first feedback information as assistance information, and determining the target resource based on the assistance information; or using the first feedback information as scheduling information, and determining that a resource indicated in the scheduling information is the target resource.

The second communications device uses the first feedback information as assistance information. It can be understood that the first feedback information is used to assist the second communications device in determining the target resource, that is, the second communications device autonomously determines a target resource for data transmission by referring to the first feedback information.

The second communications device uses the first feedback information as scheduling information. It can be construed as that the second communications device performs data transmission based on the first feedback information, that is, the first communications device determines the target resource for transmitting data by the second communications device.

Optionally, before the receiving the first feedback information transmitted by the first communications device, the method further includes:

transmitting a monitoring trigger message to the first communications device.

The monitoring trigger message is used to trigger the first communications device to perform interference monitoring on the transmission resource, so as to obtain the first feedback information.

Optionally, the monitoring trigger message is transmitted by using at least one of the following resources:

a default resource pool or dedicated resource pool that is pre-configured by a network-side device;

a separate physical channel resource; or a resource semi-statically reserved by the network-side device.

Optionally, the default resource pool or the dedicated resource pool is obtained from at least one of the following messages:

system information transmitted by the network-side device;

a downlink control information DCI message or radio resource control RRC message transmitted by the network-side device; or a sidelink control information SCI message transmitted by a terminal.

Optionally, the separate physical channel resource includes at least one of the following:

a resource on which at least one of physical sidelink control channel PSCCH, physical sidelink shared channel PSSCH, physical sidelink discovery channel PSDCH, physical sidelink broadcast channel PSBCH, physical downlink shared channel PDSCH, physical downlink control channel PDCCH, or physical broadcast channel PBCH is located; or a resource on which a first channel is located.

Optionally, the semi-statically reserved resource includes at least one of the following:

at least one slot configured by the network-side device;

at least one symbol in at least one slot configured by the network-side device; or at least one segment of frequency-domain resources configured by the network-side device.

Optionally, the semi-statically reserved resource is obtained from at least one of the following messages:

system information transmitted by the network-side device;

a DCI message or RRC message transmitted by the network-side device; or an SCI message transmitted by a terminal.

Optionally, the monitoring trigger message includes at least one of the following:

an identifier ID of the first communications device;

an ID of the second communications device;

a resource location indication for performing interference monitoring by the first communications device;

a resource location indication for transmitting the first feedback information by the first communications device;

power control information for transmitting the first feedback information by the first communications device;

an indication of transmission periodicity or next transmission occasion for transmitting the first feedback information by the first communications device;

a data size indication for transmitting the first feedback information by the first communications device; or a retransmission resource indication.

Optionally, the monitoring trigger message is carried in at least one of a scheduling request SR, a buffer status report BSR, a MAC control element MAC CE, SCI, sidelink feedback control information SFCI, or RRC.

Optionally, a transmission mode of the monitoring trigger message includes at least one of a semi-static transmission mode or a dynamic transmission mode.

Optionally, in the semi-static transmission mode, a transmission periodicity of the monitoring trigger message is N times a data transmission/reception periodicity of the transmit terminal, where N is a positive integer.

Optionally, the first feedback information is fed back by using at least one of the following resources:

a resource indicated by a monitoring trigger message that is transmitted by the second communications device;

a default resource pool or dedicated resource pool that is pre-configured by a network-side device;

a separate physical channel resource; or a resource semi-statically reserved by the network-side device.

Optionally, the default resource pool or the dedicated resource pool is obtained from at least one of the following messages:

system information transmitted by the network-side device;

a DCI message or RRC message transmitted by the network-side device; or an SCI message transmitted by a terminal.

Optionally, the separate physical channel resource includes at least one of the following:

a resource on which at least one of PSCCH, PSSCH, PSDCH, PSBCH, PDSCH, PDCCH, or PBCH is located; or a resource on which a second channel is located.

Optionally, the semi-statically reserved resource includes at least one of the following:

at least one slot configured by the network-side device;

at least one symbol in at least one slot configured by the network-side device; or at least one segment of frequency-domain resources configured by the network-side device.

Optionally, the first feedback information includes at least one of the following:

a signal strength of a wanted signal, where the signal strength of the wanted signal includes at least one of reference signal received power RSRP or received signal strength indication RSSI of the wanted signal;

a signal strength of an interference signal, where the signal strength of the interference signal includes at least one of RSRP or RSSI of the interference signal;

a resource indication for the transmission resource;

a time-domain indication for the target resource;

a frequency-domain indication for the target resource;

at least one of modulation and coding scheme MCS order, modulation scheme, or code rate indication for the target resource; or transmit power information for the target resource.

Optionally, the first feedback information is carried by using at least one of SCI, SFCI, RRC, or MAC CE.

A decoding property of the first feedback information includes at least one of the following:

the first feedback information is decodable by the second communications device;

the first feedback information is decodable by all communications devices; or the first feedback information is decodable by at least two communications devices including the second communications device.

Optionally, a transmission mode of the first feedback information includes at least one of a semi-static transmission mode or a dynamic transmission mode.

Optionally, in the semi-static transmission mode, a transmission periodicity of the first feedback information is M times a data transmission/reception periodicity of the transmit terminal, where M is a positive integer.

Optionally, in the dynamic transmission mode, a transmission occasion for the first feedback information is indicated by a monitoring trigger message that is transmitted by the second communications device.

It should be noted that this embodiment of this disclosure is used as an embodiment of the second communications device corresponding to the embodiment shown in FIG. 2. For specific implementations, reference may be made to the related description of the embodiment shown in FIG. 2 and the same beneficial effects can be achieved. To avoid repetition, details are not described herein again.

Figure 4:
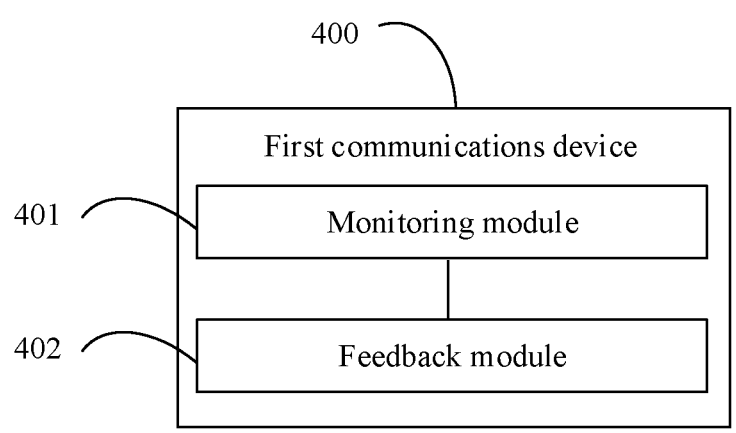
FIG. 4 is a structural diagram of a first communications device according to an embodiment of this disclosure.

FIG. 4 is a structural diagram of a first communications device according to an embodiment of this disclosure. As shown in FIG. 4, the first communications device 400 includes:

a monitoring module 401, configured to perform interference monitoring on a transmission resource; and a feedback module 402, configured to transmit first feedback information to a second communications device.

The first feedback information is information that is determined by the first communications device based on an interference monitoring result, the first feedback information is used for the second communications device to determine a target resource, and the target resource is used for a transmit terminal to transmit data to a receive terminal.

The first communications device is the receive terminal, and the second communications device includes at least one of the transmit terminal or a scheduling node; or the first communications device is the transmit terminal, and the second communications device includes at least one of the receive terminal or a scheduling node.

Figure 5:
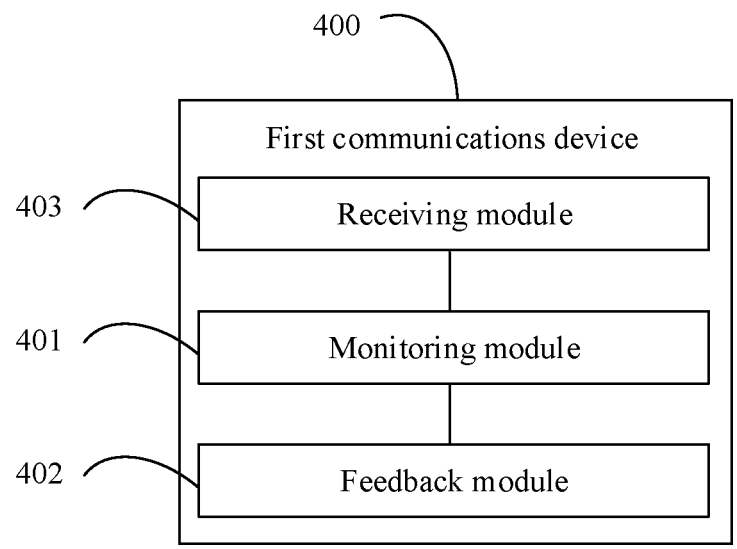
FIG. 5 is a structural diagram of another first communications device according to an embodiment of this disclosure.

Optionally, as shown in FIG. 5, the first communications device 400 further includes:

a receiving module 403, configured to receive a monitoring trigger message transmitted by the second communications device.

The monitoring module 401 is specifically configured to:
perform interference monitoring on the transmission resource based on the monitoring trigger message.

Optionally, the monitoring module 401 is specifically configured to:
perform interference monitoring on the transmission resource based on a pre-configured interference monitoring parameter.

Optionally, the monitoring module 401 is specifically configured to:
decode second feedback information transmitted by a third communications device.

The first feedback information is information that is determined by the first communications device based on the second feedback information.

The third communications device includes neither the transmit terminal nor the receive terminal, and the second feedback information is resource indication information for transmitting data by the third communications device.

Optionally, the transmission resource is a determined resource pool.

The monitoring module 401 is specifically configured to:
monitor interference intensity on a full band or subband of the transmission resource within a preset time; and
obtain the first feedback information based on a detected value of the interference intensity.

Optionally, the monitoring trigger message is transmitted by using at least one of the following resources:
a default resource pool or dedicated resource pool that is pre-configured by a network-side device;
a separate physical channel resource; or
a resource semi-statically reserved by the network-side device.

Optionally, the default resource pool or the dedicated resource pool is obtained from at least one of the following messages:
system information transmitted by the network-side device;
a downlink control information DCI message or radio resource control RRC message transmitted by the network-side device; or
a sidelink control information SCI message transmitted by a terminal.

Optionally, the separate physical channel resource includes at least one of the following:
a resource on which at least one of physical sidelink control channel PSCCH, physical sidelink shared channel PSSCH, physical sidelink discovery channel PSDCH, physical sidelink broadcast channel PSBCH, physical downlink shared channel PDSCH, physical downlink control channel PDCCH, or physical broadcast channel PBCH is located; or
a resource on which a first channel is located.

Optionally, the semi-statically reserved resource includes at least one of the following:
at least one slot configured by the network-side device;
at least one symbol in at least one slot configured by the network-side device; or
at least one segment of frequency-domain resources configured by the network-side device.

Optionally, the semi-statically reserved resource is obtained from at least one of the following messages:
system information transmitted by the network-side device;
a DCI message or RRC message transmitted by the network-side device; or
an SCI message transmitted by a terminal.

Optionally, the monitoring trigger message includes at least one of the following:
an identifier ID of the first communications device;
an ID of the second communications device;
a resource location indication for performing interference monitoring by the first communications device;
a resource location indication for transmitting the first feedback information by the first communications device;
power control information for transmitting the first feedback information by the first communications device;
an indication of transmission periodicity or next transmission occasion for transmitting the first feedback information by the first communications device;
a data size indication for transmitting the first feedback information by the first communications device; or
a retransmission resource indication.

Optionally, the monitoring trigger message is carried in at least one of a scheduling request SR, a buffer status report BSR, a MAC control element MAC CE, SCI, sidelink feedback control information SFCI, or RRC.

Optionally, a transmission mode of the monitoring trigger message includes at least one of a semi-static transmission mode or a dynamic transmission mode.

Optionally, in the semi-static transmission mode, a transmission periodicity of the monitoring trigger message is N times a data transmission/reception periodicity of the transmit terminal, where N is a positive integer.

Optionally, the interference monitoring parameter includes at least one of the following:
a periodicity parameter for interference monitoring; or
an indication of a to-be-monitored resource location.

Optionally, the interference monitoring parameter is obtained via at least one of the following:
system information transmitted by the network-side device;
a DCI message or RRC message transmitted by the network-side device; or
an SCI message transmitted by a terminal.

Optionally, the first feedback information is transmitted by using at least one of the following resources:
a resource indicated by a monitoring trigger message that is transmitted by the second communications device;
a default resource pool or dedicated resource pool that is pre-configured by a network-side device;
a separate physical channel resource; or
a resource semi-statically reserved by the network-side device.

Optionally, the default resource pool or the dedicated resource pool is obtained from at least one of the following messages:
system information transmitted by the network-side device;
a DCI message or RRC message transmitted by the network-side device; or
an SCI message transmitted by a terminal.

Optionally, the separate physical channel resource includes at least one of the following:
a resource on which at least one of PSCCH, PSSCH, PSDCH, PSBCH, PDSCH, PDCCH, or PBCH is located; or
a resource on which a second channel is located.

Optionally, the semi-statically reserved resource includes at least one of the following:
at least one slot configured by the network-side device;
at least one symbol in at least one slot configured by the network-side device; or
at least one segment of frequency-domain resources configured by the network-side device.

Optionally, the first feedback information includes at least one of the following:

a signal strength of a wanted signal, where the signal strength of the wanted signal includes at least one of reference signal received power RSRP or received signal strength indication RSSI of the wanted signal;

a signal strength of an interference signal, where the signal strength of the interference signal includes at least one of RSRP or RSSI of the interference signal;

a resource indication for the transmission resource;

a time-domain indication for the target resource;

a frequency-domain indication for the target resource;

at least one of modulation and coding scheme MCS order, modulation scheme, or code rate indication for the target resource; or transmit power information for the target resource.

Optionally, the first feedback information is carried by using at least one of SCI, SFCI, RRC, or MAC CE.

Optionally, the transmission resource on which the first communications device performs interference monitoring is obtained via at least one of the following:

a monitoring trigger message transmitted by the second communications device;

system information transmitted by the network-side device;

a DCI message or RRC message transmitted by the network-side device; or an SCI message transmitted by a terminal.

Optionally, a decoding property of the first feedback information includes at least one of the following:

the first feedback information is decodable by the second communications device;

the first feedback information is decodable by all communications devices; or the first feedback information is decodable by at least two communications devices including the second communications device.

Optionally, a transmission mode of the first feedback information includes at least one of a semi-static transmission mode or a dynamic transmission mode.

Optionally, in the semi-static transmission mode, a transmission periodicity of the first feedback information is M times a data transmission/reception periodicity of the transmit terminal, where M is a positive integer.

Optionally, in the dynamic transmission mode, a transmission occasion for the first feedback information is indicated by a monitoring trigger message that is transmitted by the second communications device.

It should be noted that the first communications device 400 in this embodiment of this disclosure may be the first communications device in any implementation of the method embodiment, and any implementation of the first communications device in the method embodiment may be implemented by the first communications device 400 in this embodiment of this disclosure, with the same beneficial effects achieved. To avoid repetition, details are not described herein again.

Figure 6:
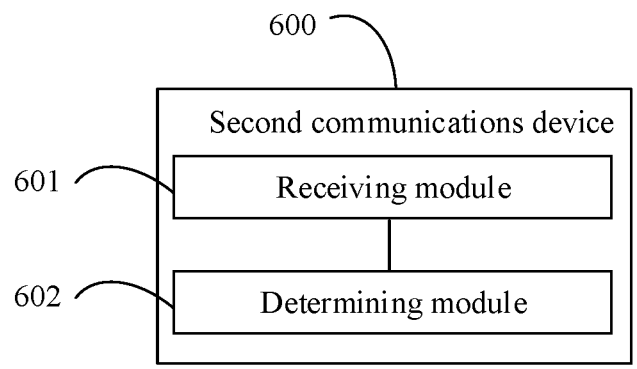
FIG. 6 is a structural diagram of a second communications device according to an embodiment of this disclosure.

FIG. 6 is a structural diagram of a second communications device according to an embodiment of this disclosure. As shown in FIG. 6, the second communications device 600 includes:

a receiving module 601, configured to receive first feedback information transmitted by a first communications device; and a determining module 602, configured to determine a target resource based on the first feedback information.

The target resource is used for a transmit terminal to transmit data to a receive terminal.

The first communications device is the receive terminal, and the second communications device includes at least one of the transmit terminal or a scheduling node; or the first communications device is the transmit terminal, and the second communications device includes at least one of the receive terminal or a scheduling node.

Optionally, the determining module 602 is specifically configured to:

use the first feedback information as assistance information, and determine the target resource based on the assistance information; or use the first feedback information as scheduling information, and determine that a resource indicated in the scheduling information is the target resource.

Figure 7:
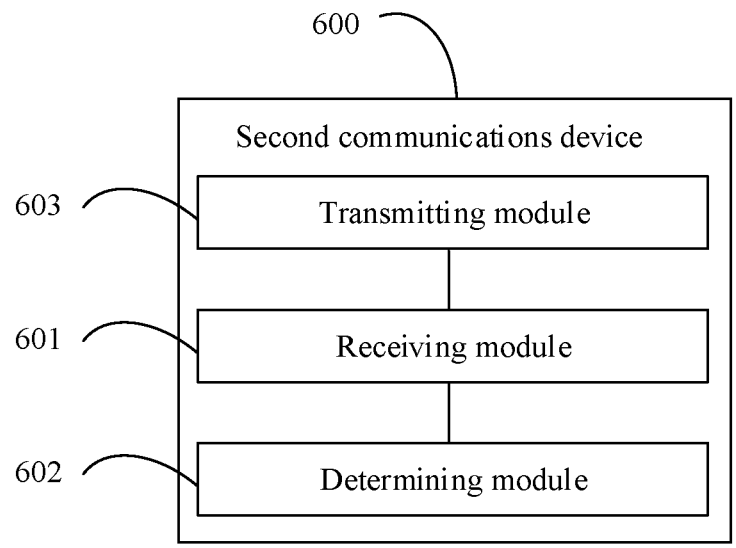
FIG. 7 is a structural diagram of another second communications device according to an embodiment of this disclosure.

Optionally, as shown in FIG. 7, the second communications device 600 further includes:

a transmitting module 603, configured to transmit a monitoring trigger message to the first communications device.

The monitoring trigger message is used to trigger the first communications device to perform interference monitoring on the transmission resource, so as to obtain the first feedback information.

Optionally, the monitoring trigger message is transmitted by using at least one of the following resources:

a default resource pool or dedicated resource pool that is pre-configured by a network-side device;

a separate physical channel resource; or a resource semi-statically reserved by the network-side device.

Optionally, the default resource pool or the dedicated resource pool is obtained from at least one of the following messages:

system information transmitted by the network-side device;

a downlink control information DCI message or radio resource control RRC message transmitted by the network-side device; or a sidelink control information SCI message transmitted by a terminal.

Optionally, the separate physical channel resource includes at least one of the following:

a resource on which at least one of physical sidelink control channel PSCCH, physical sidelink shared channel PSSCH, physical sidelink discovery channel PSDCH, physical sidelink broadcast channel PSBCH, physical downlink shared channel PDSCH, physical downlink control channel PDCCH, or physical broadcast channel PBCH is located; or a resource on which a first channel is located.

Optionally, the semi-statically reserved resource includes at least one of the following:

at least one slot configured by the network-side device;

at least one symbol in at least one slot configured by the network-side device; or at least one segment of frequency-domain resources configured by the network-side device.

Optionally, the semi-statically reserved resource is obtained from at least one of the following messages:

system information transmitted by the network-side device;

a DCI message or RRC message transmitted by the network-side device; or an SCI message transmitted by a terminal.

Optionally, the monitoring trigger message includes at least one of the following:
an identifier ID of the first communications device;
an ID of the second communications device;
a resource location indication for performing interference monitoring by the first communications device;
a resource location indication for transmitting the first feedback information by the first communications device;
power control information for transmitting the first feedback information by the first communications device;
an indication of transmission periodicity or next transmission occasion for transmitting the first feedback information by the first communications device;
a data size indication for transmitting the first feedback information by the first communications device; or
a retransmission resource indication.

Optionally, the monitoring trigger message is carried in at least one of a scheduling request SR, a buffer status report BSR, a MAC control element MAC CE, SCI, sidelink feedback control information SFCI, or RRC.

Optionally, a transmission mode of the monitoring trigger message includes at least one of a semi-static transmission mode or a dynamic transmission mode.

Optionally, in the semi-static transmission mode, a transmission periodicity of the monitoring trigger message is N times a data transmission/reception periodicity of the transmit terminal, where N is a positive integer.

Optionally, the first feedback information is fed back by using at least one of the following resources:
a resource indicated by a monitoring trigger message that is transmitted by the second communications device;
a default resource pool or dedicated resource pool that is pre-configured by a network-side device;
a separate physical channel resource; or
a resource semi-statically reserved by the network-side device.

Optionally, the default resource pool or the dedicated resource pool is obtained from at least one of the following messages:
system information transmitted by the network-side device;
a DCI message or RRC message transmitted by the network-side device; or
an SCI message transmitted by a terminal.

Optionally, the separate physical channel resource includes at least one of the following:
a resource on which at least one of PSCCH, PSSCH, PSDCH, PSBCH, PDSCH, PDCCH, or PBCH is located; or
a resource on which a second channel is located.

Optionally, the semi-statically reserved resource includes at least one of the following:
at least one slot configured by the network-side device;
at least one symbol in at least one slot configured by the network-side device; or
at least one segment of frequency-domain resources configured by the network-side device.

Optionally, the first feedback information includes at least one of the following:
a signal strength of a wanted signal, where the signal strength of the wanted signal includes at least one of reference signal received power RSRP or received signal strength indication RSSI of the wanted signal;
a signal strength of an interference signal, where the signal strength of the interference signal includes at least one of RSRP or RSSI of the interference signal;
a resource indication for the transmission resource;
a time-domain indication for the target resource;
a frequency-domain indication for the target resource;
at least one of modulation and coding scheme MCS order, modulation scheme, or code rate indication for the target resource; or
transmit power information for the target resource.

Optionally, the first feedback information is carried by using at least one of SCI, SFCI, RRC, or MAC CE.

A decoding property of the first feedback information includes at least one of the following:
the first feedback information is decodable by the second communications device;
the first feedback information is decodable by all communications devices; or
the first feedback information is decodable by at least two communications devices including the second communications device.

Optionally, a transmission mode of the first feedback information includes at least one of a semi-static transmission mode or a dynamic transmission mode.

Optionally, in the semi-static transmission mode, a transmission periodicity of the first feedback information is M times a data transmission/reception periodicity of the transmit terminal, where M is a positive integer.

Optionally, in the dynamic transmission mode, a transmission occasion for the first feedback information is indicated by a monitoring trigger message that is transmitted by the second communications device.

Figure 8:
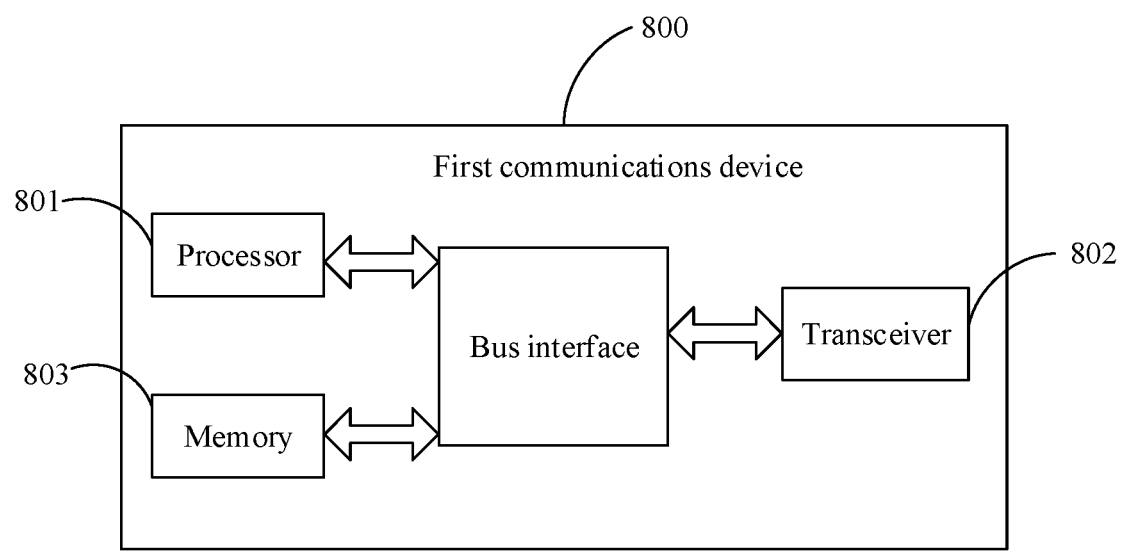
FIG. 8 is a schematic diagram of a hardware structure of another first communications device according to an embodiment of this disclosure.

FIG. 8 is a structural diagram of a first communications device according to an embodiment of this disclosure. As shown in FIG. 8, the first communications device 800 includes a processor 801, a transceiver 802, a memory 803, and a bus interface.

The processor 801 is configured to:
perform interference monitoring on a transmission resource, and obtain first feedback information.

The processor 801 or the transceiver 802 is configured to:
transmit the first feedback information to a second communications device.

The first feedback information is information that is determined by the first communications device based on an interference monitoring result, the first feedback information is used for the second communications device to determine a target resource, and the target resource is used for a transmit terminal to transmit data to a receive terminal.

The first communications device is the receive terminal, and the second communications device includes at least one of the transmit terminal or a scheduling node; or
the first communications device is the transmit terminal, and the second communications device includes at least one of the receive terminal or a scheduling node.

Optionally, the transceiver 802 is further configured to:
receive a monitoring trigger message transmitted by the second communications device.

When executing the step of performing interference monitoring on the transmission resource, the processor 801 is configured to:
perform interference monitoring on the transmission resource based on the monitoring trigger message.

Optionally, the monitoring trigger message is transmitted by using at least one of the following resources:
a default resource pool or dedicated resource pool that is pre-configured by a network-side device;
a separate physical channel resource; or
a resource semi-statically reserved by the network-side device.

Optionally, the default resource pool or the dedicated resource pool is obtained from at least one of the following messages:

system information transmitted by the network-side device;

a downlink control information DCI message or radio resource control RRC message transmitted by the network-side device; or a sidelink control information SCI message transmitted by a terminal.

Optionally, the separate physical channel resource includes at least one of the following:

a resource on which at least one of physical sidelink control channel PSCCH, physical sidelink shared channel PSSCH, physical sidelink discovery channel PSDCH, physical sidelink broadcast channel PSBCH, physical downlink shared channel PDSCH, physical downlink control channel PDCCH, or physical broadcast channel PBCH is located; or a resource on which a first channel is located.

Optionally, the semi-statically reserved resource includes at least one of the following:

at least one slot configured by the network-side device;

at least one symbol in at least one slot configured by the network-side device; or at least one segment of frequency-domain resources configured by the network-side device.

Optionally, the semi-statically reserved resource is obtained from at least one of the following messages:

system information transmitted by the network-side device;

a DCI message or RRC message transmitted by the network-side device; or an SCI message transmitted by a terminal.

Optionally, the monitoring trigger message includes at least one of the following:

an identifier ID of the first communications device;

an ID of the second communications device;

a resource location indication for performing interference monitoring by the first communications device;

a resource location indication for transmitting the first feedback information by the first communications device;

power control information for transmitting the first feedback information by the first communications device;

an indication of transmission periodicity or next transmission occasion for transmitting the first feedback information by the first communications device;

a data size indication for transmitting the first feedback information by the first communications device; or a retransmission resource indication.

Optionally, the monitoring trigger message is carried in at least one of a scheduling request SR, a buffer status report BSR, a MAC control element MAC CE, SCI, sidelink feedback control information SFCI, or RRC.

Optionally, a transmission mode of the monitoring trigger message includes at least one of a semi-static transmission mode or a dynamic transmission mode.

Optionally, in the semi-static transmission mode, a transmission periodicity of the monitoring trigger message is N times a data transmission/reception periodicity of the transmit terminal, where N is a positive integer.

Optionally, the interference monitoring parameter includes at least one of the following:

a periodicity parameter for interference monitoring; or a resource indication for the transmission resource;

Optionally, the interference monitoring parameter is obtained via at least one of the following:

system information transmitted by the network-side device;

a DCI message or RRC message transmitted by the network-side device; or an SCI message transmitted by a terminal.

Optionally, the first feedback information is fed back by using at least one of the following resources:

a resource indicated by a monitoring trigger message that is transmitted by the second communications device;

a default resource pool or dedicated resource pool that is pre-configured by a network-side device;

a separate physical channel resource; or a resource semi-statically reserved by the network-side device.

Optionally, the default resource pool or the dedicated resource pool is obtained from at least one of the following messages:

system information transmitted by the network-side device;

a DCI message or RRC message transmitted by the network-side device; or an SCI message transmitted by a terminal.

Optionally, the separate physical channel resource includes at least one of the following:

a resource on which at least one of PSCCH, PSSCH, PSDCH, PSBCH, PDSCH, PDCCH, or PBCH is located; or a resource on which a second channel is located.

Optionally, the semi-statically reserved resource includes at least one of the following:

at least one slot configured by the network-side device;

at least one symbol in at least one slot configured by the network-side device; or at least one segment of frequency-domain resources configured by the network-side device.

Optionally, the first feedback information includes at least one of the following:

a signal strength of a wanted signal, where the signal strength of the wanted signal includes at least one of reference signal received power RSRP or received signal strength indication RSSI of the wanted signal;

a signal strength of an interference signal, where the signal strength of the interference signal includes at least one of RSRP or RSSI of the interference signal;

a resource indication for the transmission resource;

a time-domain indication for the target resource;

a frequency-domain indication for the target resource;

at least one of modulation and coding scheme MCS order, modulation scheme, and code rate indication for the target resource; or transmit power information for the target resource.

Optionally, the first feedback information is carried by using at least one of SCI, SFCI, RRC, or MAC CE.

Optionally, the transmission resource on which the first communications device performs interference monitoring is obtained via at least one of the following:

a monitoring trigger message transmitted by the second communications device;

system information transmitted by the network-side device;

a DCI message or RRC message transmitted by the network-side device; or an SCI message transmitted by a terminal.

Optionally, a decoding property of the first feedback information includes at least one of the following:

the first feedback information is decodable by the second communications device;

the first feedback information is decodable by all communications devices; or the first feedback information is decodable by at least two communications devices including the second communications device.

Optionally, a transmission mode of the first feedback information includes at least one of a semi-static transmission mode or a dynamic transmission mode.

Optionally, in the semi-static transmission mode, a transmission periodicity of the first feedback information is M times a data transmission/reception periodicity of the transmit terminal, where M is a positive integer.

Optionally, in the dynamic transmission mode, a transmission occasion for the first feedback information is indicated by a monitoring trigger message that is transmitted by the second communications device.

Optionally, when performing the step of obtaining the first feedback information, the processor 801 is configured to:

decode second feedback information transmitted by a third communications device.

The first feedback information is information that is determined by the first communications device based on the second feedback information.

The third communications device includes neither the transmit terminal nor the receive terminal, and the second feedback information is resource indication information for transmitting data by the third communications device.

Optionally, when executing the step of performing interference monitoring on the transmission resource and obtaining the first feedback information, the processor 801 is configured to:

monitor interference intensity on a full band or subband of the transmission resource within a preset time; and obtain the first feedback information based on a detected value of the interference intensity.

In FIG. 8, a bus architecture may include any quantity of interconnected buses and bridges, and specifically connects together circuits that are of one or more processors represented by the processor 801 and of a memory represented by the memory 803. The bus architecture may further interconnect various other circuits such as a peripheral device, a voltage regulator, and a power management circuit. These are all well known in the art, and therefore are not further described in this specification. The bus interface provides an interface. The transceiver 802 may be a plurality of components, including a transmitter and a receiver, and provides units for communicating with a variety of other apparatuses on a transmission medium. For different terminals, the user interface 804 may also be an interface that can be externally or internally connected to a required device. The connected device includes but is not limited to a keypad, a display, a speaker, a microphone, a joystick, and the like.

The processor 801 is responsible for management of the bus architecture and general processing, and the memory 803 is capable of storing data that is used by the processor 801 during operation.

It should be noted that the first communications device 800 in this embodiment may be the first communications device in any implementation of the method embodiment of the embodiments of this disclosure, and any implementation of the first communications device in the method embodiment of the embodiments of this disclosure may be implemented by the first communications device 800 in this embodiment, with the same beneficial effects achieved. Details are not be described herein again.

Figure 9:
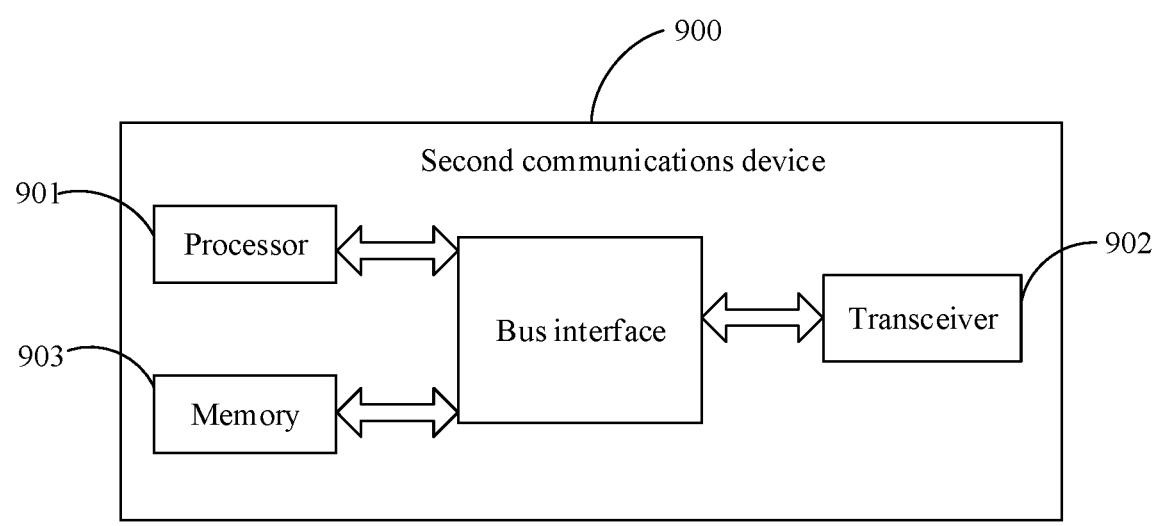
FIG. 9 is a schematic diagram of a hardware structure of another second communications device according to an embodiment of this disclosure.

FIG. 9 is a structural diagram of a second communications device according to an embodiment of this disclosure. As shown in FIG. 9, the second communications device 900 includes a processor 901, a transceiver 902, a memory 903, and a bus interface.

The transceiver 902 is configured to:

receive first feedback information transmitted by a first communications device, where the first feedback information is information that is determined by the first communications device based on an interference monitoring result.

The processor 901 is configured to:

determine a target resource based on the first feedback information.

The target resource is used for a transmit terminal to transmit data to a receive terminal.

The first communications device is the receive terminal, and the second communications device includes at least one of the transmit terminal or a scheduling node; or the first communications device is the transmit terminal, and the second communications device includes at least one of the receive terminal or a scheduling node.

Optionally, when executing the step of determining the target resource based on the first feedback information, the processor 901 is configured to:

use the first feedback information as assistance information, and determine the target resource based on the assistance information; or use the first feedback information as scheduling information, and determine that a resource indicated in the scheduling information is the target resource.

Optionally, the transceiver 902 is further configured to:

transmit a monitoring trigger message to the first communications device.

The monitoring trigger message is used to trigger the first communications device to perform interference monitoring on the transmission resource, so as to obtain the first feedback information.

Optionally, the monitoring trigger message is transmitted by using at least one of the following resources:

a default resource pool or dedicated resource pool that is pre-configured by a network-side device;

a separate physical channel resource; or a resource semi-statically reserved by the network-side device.

Optionally, the default resource pool or the dedicated resource pool is obtained from at least one of the following messages:

system information transmitted by the network-side device;

a downlink control information DCI message or radio resource control RRC message transmitted by the network-side device; or a sidelink control information SCI message transmitted by a terminal.

Optionally, the separate physical channel resource includes at least one of the following:

a resource on which at least one of physical sidelink control channel PSCCH, physical sidelink shared channel PSSCH, physical sidelink discovery channel PSDCH, physical sidelink broadcast channel PSBCH, physical downlink shared channel PDSCH, physical downlink control channel PDCCH, or physical broadcast channel PBCH is located; or a resource on which a first channel is located.

Optionally, the semi-statically reserved resource includes at least one of the following:

at least one slot configured by the network-side device;

at least one symbol in at least one slot configured by the network-side device; or at least one segment of frequency-domain resources configured by the network-side device.

Optionally, the semi-statically reserved resource is obtained from at least one of the following messages:

system information transmitted by the network-side device;

a DCI message or RRC message transmitted by the network-side device; or an SCI message transmitted by a terminal.

Optionally, the monitoring trigger message includes at least one of the following:

an identifier ID of the first communications device;

an ID of the second communications device;

a resource location indication for performing interference monitoring by the first communications device;

a resource location indication for transmitting the first feedback information by the first communications device;

power control information for transmitting the first feedback information by the first communications device;

an indication of transmission periodicity or next transmission occasion for transmitting the first feedback information by the first communications device;

a data size indication for transmitting the first feedback information by the first communications device; or a retransmission resource indication.

Optionally, the monitoring trigger message is carried in at least one of a scheduling request SR, a buffer status report BSR, a MAC control element MAC CE, SCI, sidelink feedback control information SFCI, or RRC.

Optionally, a transmission mode of the monitoring trigger message includes at least one of a semi-static transmission mode or a dynamic transmission mode.

Optionally, in the semi-static transmission mode, a transmission periodicity of the monitoring trigger message is N times a data transmission/reception periodicity of the transmit terminal, where N is a positive integer.

Optionally, the first feedback information is fed back by using at least one of the following resources:

a resource indicated by a monitoring trigger message that is transmitted by the second communications device;

a default resource pool or dedicated resource pool that is pre-configured by a network-side device;

a separate physical channel resource; or a resource semi-statically reserved by the network-side device.

Optionally, the default resource pool or the dedicated resource pool is obtained from at least one of the following messages:

system information transmitted by the network-side device;

a DCI message or RRC message transmitted by the network-side device; or an SCI message transmitted by a terminal.

Optionally, the separate physical channel resource includes at least one of the following:

a resource on which at least one of PSCCH, PSSCH, PSDCH, PSBCH, PDSCH, PDCCH, or PBCH is located; or a resource on which a second channel is located.

Optionally, the semi-statically reserved resource includes at least one of the following:

at least one slot configured by the network-side device;

at least one symbol in at least one slot configured by the network-side device; or at least one segment of frequency-domain resources configured by the network-side device.

Optionally, the first feedback information includes at least one of the following:

a signal strength of a wanted signal, where the signal strength of the wanted signal includes at least one of reference signal received power RSRP or received signal strength indication RSSI of the wanted signal;

a signal strength of an interference signal, where the signal strength of the interference signal includes at least one of RSRP or RSSI of the interference signal;

a resource indication for the transmission resource;

a time-domain indication for the target resource;

a frequency-domain indication for the target resource;

at least one of modulation and coding scheme MCS order, modulation scheme, and code rate indication for the target resource; or transmit power information for the target resource.

Optionally, the first feedback information is carried by using at least one of SCI, SFCI, RRC, or MAC CE.

A decoding property of the first feedback information includes at least one of the following:

the first feedback information is decodable by the second communications device;

the first feedback information is decodable by all communications devices; or the first feedback information is decodable by at least two communications devices including the second communications device.

Optionally, a transmission mode of the first feedback information includes at least one of a semi-static transmission mode or a dynamic transmission mode.

Optionally, in the semi-static transmission mode, a transmission periodicity of the first feedback information is M times a data transmission/reception periodicity of the transmit terminal, where M is a positive integer.

Optionally, in the dynamic transmission mode, a transmission occasion for the first feedback information is indicated by a monitoring trigger message that is transmitted by the second communications device.

In FIG. 9, a bus architecture may include any quantity of interconnected buses and bridges, and specifically connects together circuits that are of one or more processors represented by the processor 901 and of a memory represented by the memory 903. The bus architecture may further interconnect various other circuits such as a peripheral device, a voltage regulator, and a power management circuit. These are all well known in the art, and therefore are not further described in this specification. The bus interface provides an interface. The transceiver 902 may be a plurality of components, including a transmitter and a receiver, and provides units for communicating with a variety of other apparatuses on a transmission medium. For different terminals, the user interface 904 may also be an interface that can be externally or internally connected to a required device. The connected device includes but is not limited to a keypad, a display, a speaker, a microphone, a joystick, and the like.

The processor 901 is responsible for management of the bus architecture and general processing, and the memory 903 is capable of storing data that is used by the processor 901 during operation.

It should be noted that the second communications device 900 in this embodiment may be the second communications device in any implementation of the method embodiment of the embodiments of this disclosure, and any implementation of the second communications device in the method embodiment of the embodiments of this disclosure may be implemented by the second communications device 900 in this embodiment, with the same beneficial effects achieved. Details are not be described herein again.

An embodiment of this disclosure further provides a computer-readable storage medium, where a computer program is stored in the computer readable storage medium. When the computer program is executed by a processor, the processes of the embodiment of the foregoing method for transmission resource monitoring corresponding to a terminal or a network device can be implemented, with same technical effects achieved. To avoid repetition, details are not described herein again. The computer readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for transmission resource monitoring, performed by a first communications device and comprising:
performing interference monitoring on a transmission resource; and
transmitting first feedback information to a second communications device; wherein the first feedback information is information that is determined by the first communications device based on an interference monitoring result, the first feedback information is used for the second communications device to directly determine, in response to transmission of the first feedback information, a target resource, and the target resource is used for a transmit terminal to transmit data to a receive terminal; wherein
the first communications device is the receive terminal, and the second communications device is the transmit terminal;
wherein the first feedback information comprises at least one of the following:
a time-domain indication for the target resource;
a frequency-domain indication for the target resource,
before performing interference monitoring on a transmission resource, the method further comprising:
receiving a monitoring trigger message transmitted by the second communications device; wherein
the performing interference monitoring on a transmission resource comprises:
performing interference monitoring on the transmission resource based on the monitoring trigger message,
wherein the monitoring trigger message comprises a resource location indication for performing interference monitoring by the first communications device.

2. The method according to claim 1, wherein the performing interference monitoring on a transmission resource comprises:
performing interference monitoring on the transmission resource based on a pre-configured interference monitoring parameter.

3. The method according to claim 2, wherein the interference monitoring parameter comprises at least one of the following:
a periodicity parameter for interference monitoring; or
an indication of a to-be-monitored resource location,
the interference monitoring parameter is obtained via at least one of the following:
system information transmitted by the network-side device;
a DCI message or RRC message transmitted by the network-side device; or
an SCI message transmitted by a terminal.

4. The method according to claim 1, wherein the monitoring trigger message is transmitted by using at least one of the following resources:
a default resource pool or dedicated resource pool that is pre-configured by a network-side device;
a separate physical channel resource; or
a resource semi-statically reserved by the network-side device.

5. The method according to claim 4, wherein the default resource pool or the dedicated resource pool is obtained from at least one of the following messages:
system information transmitted by the network-side device;
a downlink control information (DCI) message or radio resource control (RRC) message transmitted by the network-side device; or
a sidelink control information (SCI) message transmitted by a terminal.

6. The method according to claim 4, wherein the separate physical channel resource comprises at least one of the following:
a resource on which at least one of physical sidelink control channel (PSCCH), a physical sidelink shared channel (PSSCH), physical sidelink discovery channel (PSDCH), physical sidelink broadcast channel (PSBCH), physical downlink shared channel (PDSCH), physical downlink control channel (PDCCH), or physical broadcast channel (PBCH) is located; or
a resource on which a first channel is located.

7. The method according to claim 4, wherein the semi-statically reserved resource comprises at least one of the following:

at least one slot configured by the network-side device;
at least one symbol in at least one slot configured by the network-side device; or at least one segment of frequency-domain resources configured by the network-side device; and/or
wherein the semi-statically reserved resource is obtained from at least one of the following messages:
system information transmitted by the network-side device;
a DCI message or RRC message transmitted by the network-side device; or
an SCI message transmitted by a terminal.

8. The method according to claim 1, wherein the monitoring trigger message further comprises at least one of the following:
an identifier (ID) of the first communications device;
an ID of the second communications device;
a resource location indication for transmitting the first feedback information by the first communications device;
power control information for transmitting the first feedback information by the first communications device;
an indication of transmission periodicity or next transmission occasion for transmitting the first feedback information by the first communications device;
a data size indication for transmitting the first feedback information by the first communications device; or
a retransmission resource indication; and/or
wherein the monitoring trigger message is carried in at least one of a scheduling request (SR), a buffer status report (BSR), a MAC control element (MAC CE), SCI, sidelink feedback control information (SFCI), or RRC.

9. The method according to claim 1, wherein a transmission mode of the monitoring trigger message comprises at least one of a semi-static transmission mode or a dynamic transmission mode;
in the semi-static transmission mode, a transmission periodicity of the monitoring trigger message is N times a data transmission/reception periodicity of the transmit terminal, wherein N is a positive integer.

10. The method according to claim 1, wherein the first feedback information is transmitted by using at least one of the following resources:
a resource indicated by a monitoring trigger message that is transmitted by the second communications device;
a default resource pool or dedicated resource pool that is pre-configured by a network-side device;
a separate physical channel resource; or
a resource semi-statically reserved by the network-side device.

11. The method according to claim 10, wherein the default resource pool or the dedicated resource pool is obtained from at least one of the following messages:
system information transmitted by the network-side device;
a DCI message or RRC message transmitted by the network-side device; or
an SCI message transmitted by a terminal; and/or
wherein the separate physical channel resource comprises at least one of the following:
a resource on which at least one of PSCCH, PSSCH, PSDCH, PSBCH, PDSCH, PDCCH, or PBCH is located; or
a resource on which a second channel is located; and/or
wherein the semi-statically reserved resource comprises at least one of the following:
at least one slot configured by the network-side device;
at least one symbol in at least one slot configured by the network-side device; or at least one segment of frequency-domain resources configured by the network-side device.

12. The method according to claim 1,
wherein the first feedback information is carried by using at least one of SCI, SFCI, RRC, or MAC CE.

13. The method according to claim 1, wherein the transmission resource on which the first communications device performs interference monitoring is obtained via at least one of the following:
a monitoring trigger message transmitted by the second communications device;
system information transmitted by the network-side device;
a DCI message or RRC message transmitted by the network-side device; or
an SCI message transmitted by a terminal.

14. The method according to claim 1, wherein a transmission mode of the first feedback information comprises at least one of a semi-static transmission mode or a dynamic transmission mode;
in the semi-static transmission mode, a transmission periodicity of the first feedback information is M times a data transmission/reception periodicity of the transmit terminal, wherein M is a positive integer; or
in the dynamic transmission mode, a transmission occasion for the first feedback information is indicated by a monitoring trigger message that is transmitted by the second communications device.

15. The method according to claim 1, wherein the transmission resource is a determined resource pool; and
the performing interference monitoring on a transmission resource comprises:
monitoring interference intensity on a full band or sub-band of the transmission resource within a preset time; wherein
the first feedback information is information that is determined by the first communications device based on a detected value of the interference intensity.

16. A method for transmission resource determination, performed by a second communications device and comprising:
receiving first feedback information transmitted by a first communications device, wherein the first feedback information is information that is determined by the first communications device based on an interference monitoring result; and
in response to reception of the first feedback information, directly determining a target resource based on the first feedback information; wherein
the target resource is used for a transmit terminal to transmit data to a receive terminal; and
the first communications device is the receive terminal, and the second communications device is the transmit terminal;
wherein the first feedback information comprises at least one of the following:
a time-domain indication for the target resource;
a frequency-domain indication for the target resource,
before receiving first feedback information transmitted by a first communications device, the method further comprising:
transmitting a monitoring trigger message to the first communications device, wherein the monitoring trigger message comprises a resource location indication for performing interference monitoring by the first communications device.

17. A communications device, comprising a memory, a processor, and a computer program stored in the memory and capable of running on the processor, wherein the computer program is executed by the processor to implement:
performing interference monitoring on a transmission resource; and
transmitting first feedback information to a second communications device; wherein
the first feedback information is information that is determined by the first communications device based on an interference monitoring result, the first feedback information is used for the second communications device to directly determine, in response to transmission of the first feedback information, a target resource, and the target resource is used for a transmit terminal to transmit data to a receive terminal; wherein
the first communications device is the receive terminal, and the second communications device is the transmit terminal;
wherein the first feedback information comprises at least one of the following:
a time-domain indication for the target resource;
a frequency-domain indication for the target resource,
wherein the computer program is executed by the processor to implement:
receiving a monitoring trigger message transmitted by the second communications device; wherein
the performing interference monitoring on a transmission resource comprises:
performing interference monitoring on the transmission resource based on the monitoring trigger message,
wherein the monitoring trigger message comprises a resource location indication for performing interference monitoring by the first communications device.

18. The communication device according to claim 17, wherein the monitoring trigger message is carried in at least one of a scheduling request (SR), a buffer status report (BSR), a MAC control element (MAC CE), SCI, sidelink feedback control information (SFCI), or RRC.

19. A communications device, comprising a memory, a processor, and a computer program stored in the memory and capable of running on the processor, wherein when the computer program is executed by the processor, the steps of the method for transmission resource determination according to claim 18 are implemented.

* * * * *